(12) United States Patent
Kumor

(10) Patent No.: US 8,542,198 B2
(45) Date of Patent: Sep. 24, 2013

(54) MULTI-TOUCH INPUT ACTUAL-SIZE DISPLAY SCREEN FOR SCANNED ITEMS

(75) Inventor: Damian Kumor, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1066 days.

(21) Appl. No.: 12/546,158

(22) Filed: Aug. 24, 2009

(65) Prior Publication Data
US 2011/0043458 A1 Feb. 24, 2011

(51) Int. Cl.
*G06F 3/041* (2006.01)

(52) U.S. Cl.
USPC .......................................................... 345/173

(58) Field of Classification Search
USPC ................. 345/173, 156; 358/475; 705/10
See application file for complete search history.

(56) References Cited

U.S. PATENT DOCUMENTS

| | | | |
|---|---|---|---|
| 5,119,079 A * | 6/1992 | Hube et al. | 715/823 |
| 5,170,267 A * | 12/1992 | Blitz et al. | 358/475 |
| 6,032,004 A | 2/2000 | Mirabella, Jr. et al. | |
| 6,908,083 B2 * | 6/2005 | Pankhania | 271/171 |
| 7,158,123 B2 * | 1/2007 | Myers et al. | 345/173 |
| 7,446,907 B2 | 11/2008 | Hosier et al. | |
| 7,473,887 B2 * | 1/2009 | Miles et al. | 250/234 |
| 7,911,444 B2 * | 3/2011 | Yee | 345/156 |
| 8,096,949 B2 * | 1/2012 | Chen et al. | 600/443 |
| 2004/0201578 A1 * | 10/2004 | Sadahiro | 345/173 |
| 2005/0041860 A1 | 2/2005 | Jager | |
| 2005/0259087 A1 * | 11/2005 | Hoshino et al. | 345/173 |
| 2005/0289059 A1 | 12/2005 | Brewington et al. | |
| 2006/0119901 A1 | 6/2006 | Ehrenfeld et al. | |
| 2007/0083752 A1 | 4/2007 | Kanou et al. | |
| 2008/0174831 A1 | 7/2008 | Dugas | |
| 2008/0249741 A1 * | 10/2008 | Hon et al. | 702/168 |
| 2010/0010873 A1 * | 1/2010 | Moreau | 705/10 |
| 2010/0194698 A1 * | 8/2010 | Hotelling et al. | 345/173 |

FOREIGN PATENT DOCUMENTS

| | | |
|---|---|---|
| CA | 2591252 A1 | 12/2008 |
| GB | 2389734 A | 12/2003 |
| JP | 2006086755 A | 3/2006 |
| JP | 2008124751 A | 5/2008 |

* cited by examiner

*Primary Examiner* — Fred Tzeng
(74) *Attorney, Agent, or Firm* — Gibb & Riley, LLC

(57) ABSTRACT

An apparatus comprises a processor, a scanner operatively connected to the processor, and a touch screen graphic user interface operatively connected to the processor. The scanner is positioned to scan a predetermined scan area and the touch screen has a screen area that has dimensions corresponding to the scan area. The touch screen is positioned adjacent the scan area such that the scan area is aligned with the screen area.

19 Claims, 14 Drawing Sheets

MULTI-TOUCH INPUT ACTUAL-SIZE DISPLAY SCREEN FOR SCANNED ITEMS

BACKGROUND AND SUMMARY

Embodiments herein generally relate to scanning devices such as electrostatographic printers and copiers or reproduction machines, and more particularly, concern a scanning device having a multi-touch graphic user interface screen that displays scanned items at their actual size.

Graphic user interfaces that accompany conventional scanners, copiers, multi-function printing machines, etc., do not reflect the scanned item in an accurate and realistic manner that the user can interpret and manipulate easily. Current touch interfaces used with scanners, copiers, multi-function printing machines, etc., allow for only one touch as a time, which limits the ability of the user to manipulate the items. With such conventional devices, touch screens only allow users to set the number of copies, change the size, set the duplex, and rotate the document; however, users cannot see the actual results of their manipulations until the document is actually printed.

In order to provide a more intuitive interface to the user, embodiments herein provide an apparatus that comprises a processor and a computer storage medium that is operatively connected (directly or indirectly connected) to the processor. The computer storage medium stores (tangibly embodies) computerized instructions that are executable by the processor that allow the apparatus to perform the functions described herein.

With embodiments herein, a scanner is operatively connected to the processor, as is a touch screen graphic user interface. The scanner is positioned to scan a predetermined "scan area." The touch screen has a screen area that has dimensions corresponding to the scan area. In other words, the touch screen is the same size (or approximately the same size) as the scan area and, therefore, the touch screen displays scanned items in actual size (or approximately actual size). This allows the user to feel as though they are working with and manipulating the actual item that was scanned.

The touch screen is positioned adjacent the scan area such that the scan area is aligned with the screen area. By being "aligned with" the scan area, the touch screen can be directly on top of a platen where the scanned item was placed. Alternatively, the touch screen can be "aligned with" a fixed-position scanner by being directly below the location where the fixed-position scanner is located. In embodiments herein, the location of the scanner is maintained proximate to and aligned with the touch screen to provide the same appearance of the scanned item on the screen (same size and location of the physical scanned item) to increase the intuitive nature of the experience provided by the embodiments herein.

The processor executes the computerized instructions to allow users to alter the scanned items appearing on the touch screen by touching, holding, dragging, etc., different locations of the touch screen. In some embodiments, a printer is operatively connected to the processor to allow the altered scanned item to be printed (output).

One specific embodiment herein comprises a printing apparatus that has a lid frame hingeably connected to a base frame. A hinge connects the base frame to the lid frame to allow the lid frame to be in an open state or a closed state. A platen can be positioned on the base frame adjacent the lid frame such that the lid frame covers the platen when the lid frame is in the closed state on the base frame.

The processor can be positioned within the base frame (or could be in the lid frame) and the scanner (that is operatively connected to the processor) is positioned adjacent the platen. The touch screen graphic user interface is positioned on the lid frame (and, again, is operatively connected to the processor). The scanner is positioned to scan a predetermined scan area of the platen. The touch screen has a screen area that has dimensions corresponding to the scan area and the touch screen is positioned adjacent the scan area such that the scan area is aligned with the screen area and the platen.

The lid frame has a touch screen side and a scanner side. The touch screen is connected to the lid frame on the touch screen side of the lid frame. The scanner can be connected to the lid frame on the scanner side of the lid frame or can be positioned within the base frame and aligned with the scanner side of the lid frame.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, current user interfaces of copiers do not reflect the actual input and output in a manner that the user can see or change easily. Current touch interfaces used with scanners, copiers, multi-function printing machines, etc., allow for only one touch as a time which limits the ability to send manipulations into the copier. Documents that are printed from a copier need user input to set the number of copies, change the size, set the duplex, and rotate the document; however, users cannot see the results of their inputs until they print the document.

The embodiments herein can, for example, include a multi-touch screen, software, a document scanning device, a printing device, etc. A multi-touch screen is an input/output device that allows for one or more simultaneous inputs (where the surface is simultaneously touched in multiple locations). Touch screens generally include a display surface (such as a liquid crystal display or similar display) and a surface that is sensitive to touch locations that can be contacted by a human finger, a pointing device, etc. A processor coordinates the location of a contact on the touch surface with the same location of an item being displayed on the display surface to identify the point or item being "touched" by the user. Touch screens are well-known to those ordinarily skilled in the art, and a detailed discussion of such devices is not provided herein. For details regarding touch screens, see U.S. Pat. No. 5,119,079 and the patents and publications mentioned therein, all of which are incorporated herein by reference.

The scanning device is used to scan a document into a computer. A scanning device generally includes a raster input scanner that is made up of one or more sensors and illumination sources that detect the characteristics (based on light reflection) of the item being scanned. The details regarding scanning devices are well-known to those ordinarily skilled in the art, and a detailed discussion of such devices is not provided herein. For details regarding scanning devices, see U.S. Pat. No. 7,446,907 and the patents and publications that are mentioned therein, all of which are incorporated herein by reference.

The scanned document is shown as a virtual document on the multi-touch screen. The user can manipulate the scanned document by touching the multi-touch screen. The user can then print the document using the printing device. With embodiments herein, the item is displayed on the multi-touch screen in its actual size (or approximate actual size) such that the scanned item is displayed at the same or approximately the same size as the item that was scanned in, and the item that will be printed. For use herein "approximate" means within 2%, 5%, or 10%, etc., of another size.

Figure 1:
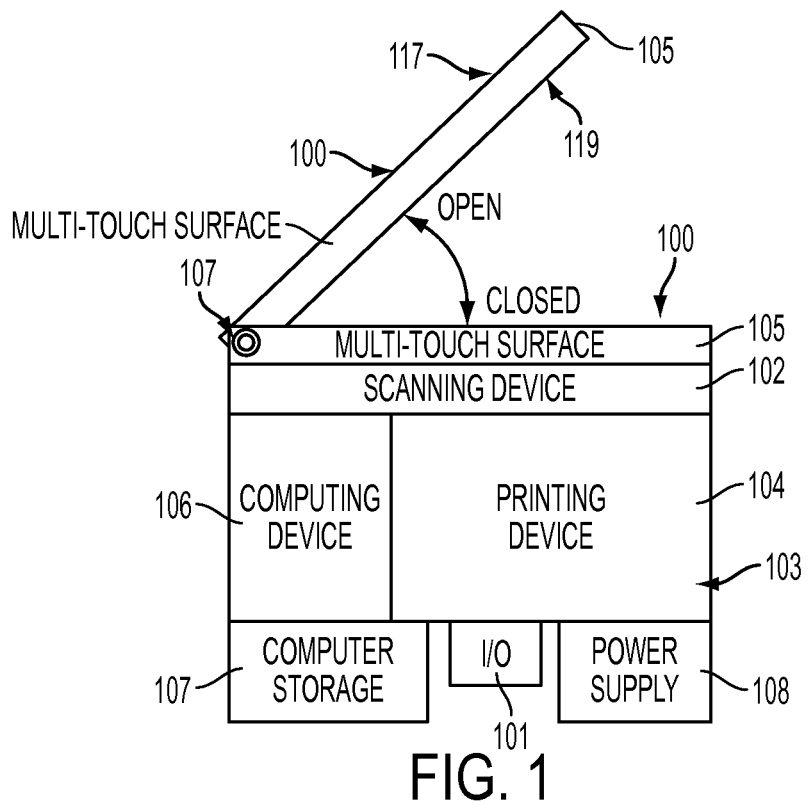
FIG. 1 is a side-view schematic diagram of a device according to embodiments herein.
Figure 2:
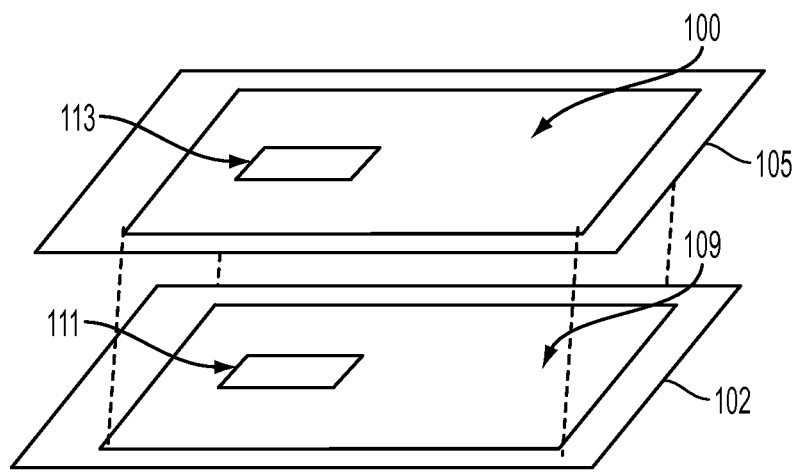
FIG. 2 is a perspective-view schematic diagram of a device according to embodiments herein.

One example of a device according to embodiments herein is shown in FIGS. 1-2. FIG. 1 illustrates a cross-sectional or side-view and FIG. 2 illustrates a top view of the exemplary device. This exemplary device includes a lid 105 having a multi-touch screen 100, a computing device 106, a document-scanning device 102, a printing device 104, an AC/DC Power Supply 108, input/output 101, and a frame 103. The frame 103 holds the devices in their places.

As shown, the lid 105 can be lifted at an angle and rotated around a hinge 107 to let the user place documents or other items to be scanned onto the scanning surface or platen of the scanning device 102. The scanning device generally includes some form of raster input sensor, such as a charge coupled device array (CCD array) that moves beneath a transparent platen in order to detect the features of the scanned item (see U.S. Pat. No. 7,446,907 mentioned above, for more details).

In FIG. 1, the lid 105 is shown in both the open and closed position. The multi-touch screen 100 is mounted in or on the lid 105. This multi-touch screen's viewing area 100 lines up with the scanning surface of the scanning device 102 when the lid is closed.

Thus, embodiments herein provide an apparatus 103 that comprises a processor 106 and a computer storage medium 107 that is operatively connected (directly or indirectly connected) to the processor 106. The computer storage medium 107 stores (tangibly embodies) computerized instructions that are executable by the processor 106 that allow the apparatus to perform the functions described herein.

The scanner 102 is operatively connected to the processor 106, as is a touch screen graphic user interface 100. The scanner 102 is positioned to scan a predetermined "scan area" 109 as shown in FIG. 2. The touch screen 100 has a screen area that has dimensions corresponding to the scan area 109 (which can also be the same as the device's platen and, thus, item 109 can represent both the scan area and the platen). Note that in FIG. 2, the scan area/platen 109 is shown slightly below the touch screen (and is not illustrated as being hinged 107) to illustrate that the touch screen 100 and scan area 109 are approximately the same size; however, in operation, the touch screen 100 and the scan area/platen 109 would be hinged and be much closer to one another when the lid 105 is in the closed position (the touch screen 100 would be directly above the scan area 109 when closed).

In other words, the touch screen 100 is the same size (or approximately the same size) as the scan area 109 and, therefore, the touch screen 100 displays scanned items in actual size (or approximately actual size). This allows the user to feel as though they are working with and manipulating the physical item 111 that was scanned (because the touch screen 100 presents an image 113 of the scanned item 111 in a location that is aligned with (directly above) the actual item 111). Further, the image 113 has the same size and orientation as the actual item 111, which also makes the experience much more intuitive for the user.

Thus, with some embodiments herein, the user can place a document 111 on the platen 109 of a scanner or copier, close the lid 105 and start a scan operation. This causes a graphical representation of the document 113 to appear on the touch screen 100 in the location where the actual document 111 was placed on the platen 109. The graphical representation 113 is approximately the actual size and orientation of the actual document 111. The user can manipulate the graphical representation 113 (e.g., rotate, shrink, expand, cut, paste, invert, etc.) by providing multiple touch inputs on the touch screen 100. When the print option is selected, the printed item will have the same approximate size, orientation, color, etc., as displayed on the touch screen 100. This makes the image of the item 113 appear more tangible and makes the interface more intuitive for the user to operate.

The touch screen 100 is positioned adjacent the scan area 109 such that the scan area 109 is aligned with the screen area 100. By being "aligned with" the scan area 109, the touch screen 100 can be directly above the platen where the scanned item was placed. In embodiments herein, the location of the scanner 102 is maintained proximate to and aligned with the touch screen 100 to provide an image 113 that has the same appearance of the scanned item on the screen 100 (same size and location of the physical scanned item 111) to increase the intuitive nature of the experience provided by the embodiments herein.

The processor 106 executes the computerized instructions to allow users to alter the scanned items appearing on the touch screen 100 by touching, holding, dragging, etc., different locations of the touch screen 100. In some embodiments, a printer is operatively connected to the processor 106 to allow the altered scanned item to be printed (output).

Some embodiments herein have a lid frame 105 hingeably connected to the base frame 103. A hinge 107 connects the base frame 103 to the lid frame 105 to allow the lid frame to be in an open state or a closed state. The platen 109 can be positioned on the base frame adjacent the lid frame such that the lid frame covers the platen when the lid frame is in the closed state on the base frame.

The processor 106 can be positioned within the base frame (or could be in the lid frame) and the scanner 102 (that is operatively connected to the processor 106) is positioned adjacent the platen. The touch screen 100 graphic user interface is positioned on the lid frame (and, again, is operatively connected to the processor 106). The scanner 102 is positioned to scan a predetermined scan area 109 of the platen. The touch screen 100 has a screen area that has dimensions corresponding to the scan area 109 and the touch screen 100 is positioned adjacent the scan area 109 such that the scan area 109 is aligned with the screen area and the platen.

The lid frame 105 has a touch screen side 117 and a scanner side 119. The touch screen 100 is connected to the lid frame 105 on the touch screen side 117 of the lid frame 105. The scanner 102 can be connected to the lid frame 105 on the scanner side 119 of the lid frame 105 or can be positioned within the base frame 113 and aligned with the scanner side 119 of the lid frame 105.

Figure 3:
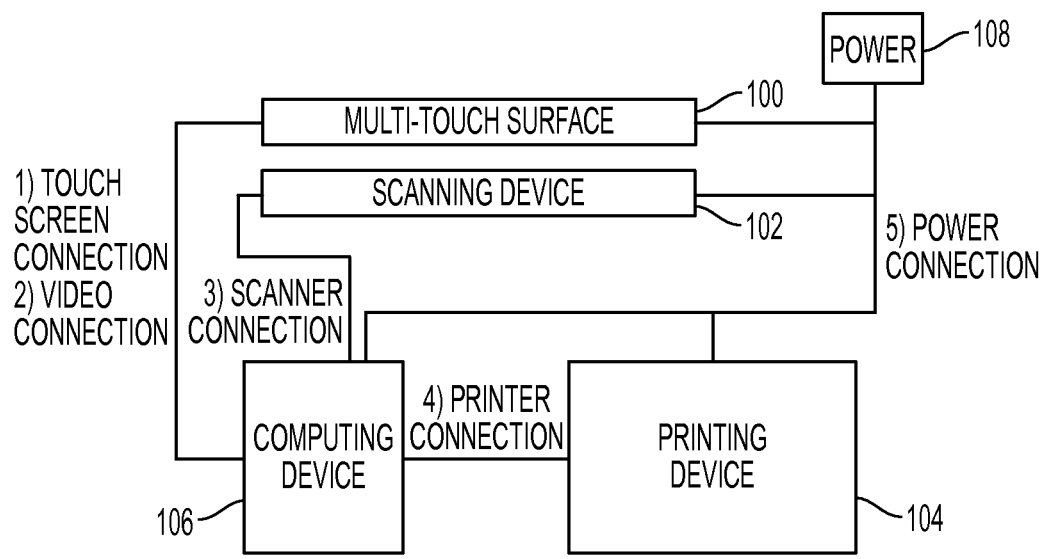
FIG. 3 is a side-view schematic diagram of a device according to embodiments herein.

Some examples of possible connections between each of the devices are shown in FIG. 3. In FIG. 3, the 1) touch screen connection is used to pass data from the multi-touch screen 100 to the computing device 106. The data passed contains information about where the user is currently touching the screen. The 2) video connection is used to pass data from the computing device 106 to the multi-touch screen 100. The data passed tells the screen what to display. The 3) scanner connection is used to pass data between the computing device 106 and the scanning device 102. The data passed from the computer to the scanner 102 tells the scanner 102 when to scan and the scanner 102 responds with the image it collects. The 4) printer connection is used to pass data between the computing device 106 and the printing device 104. The data passed from the computer to the printer tells the printer what to print and the printer responds with status data. The 4) power connection connects each device to a central AC/DC power adapter or other power sources.

Figure 4A:
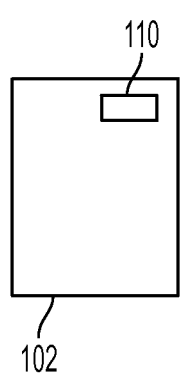
FIG. 4A-4D are top-view schematic diagrams of a device according to embodiments herein.

FIGS. 4A-4D are schematic top-view diagrams of a platen and the multi-touch screen 100 and illustrate the basic usage of the device which is to scan and print documents. The user begins using the device by lifting the lid 105 off of the scanner's scanning surface 102. As shown in FIG. 4A, the user then places the document 110 to scan on the scanning surface 102 and closes the lid 105. When the lid 105 is closed the multi-touch monitor 100 will display a button 115 for scanning a document. Item 112 represents some form of item utilized to contact the multi-touch monitor 100 including, a user's finger, a pointing device, etc.

Figure 4B:
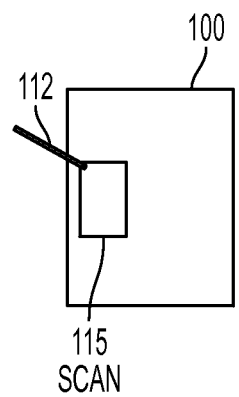
Figure 4C:
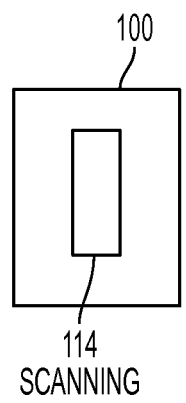
Figure 4D:
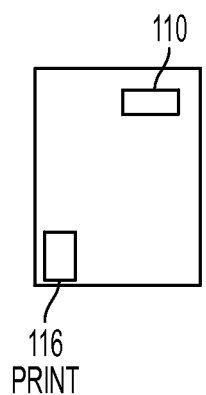

When the user touches 112 the scan button 115 in FIG. 4B, the computing device will be alerted by the multi-touch display. The computing device will instruct the scanner 102 to begin scanning and have the display icon inform the user it is scanning 114, as shown in FIGS. 4B and 4C. When the scanning 114 is complete, the computing device will show the user a graphical representation of the document 110 that was scanned. At this point, the user has the option to manipulate the graphical representations of the document(s) 110 that have been scanned. To print the document 110 that is displayed, the user can select the print button 116 that is displayed on the multi-touch screen.

Figure 5:
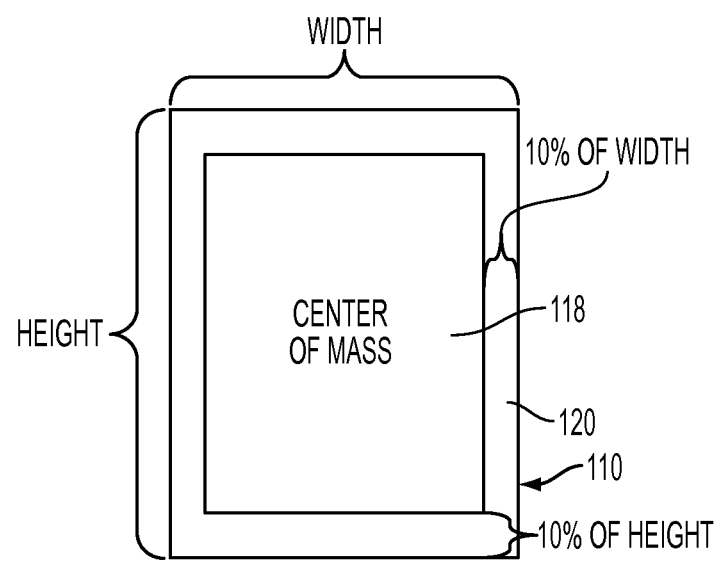
FIG. 5 is a top-view schematic diagram of a device according to embodiments herein.
Figure 6:
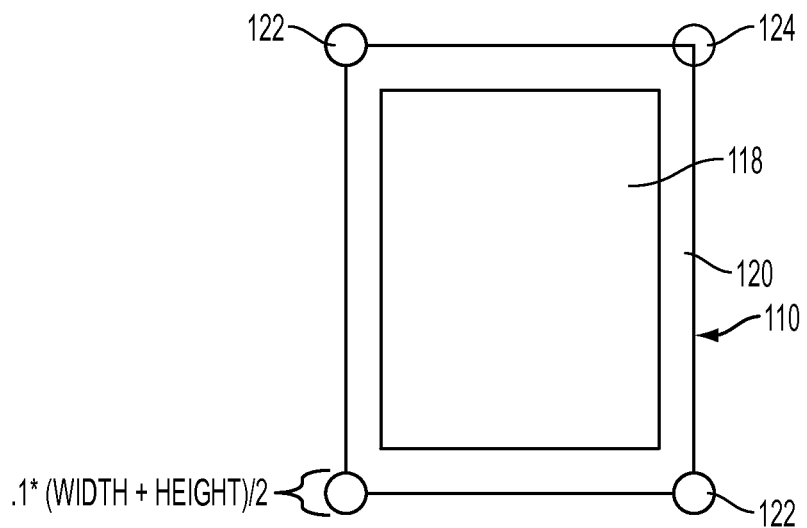
FIG. 6 is a top-view schematic diagram of a device according to embodiments herein.
Figure 7:
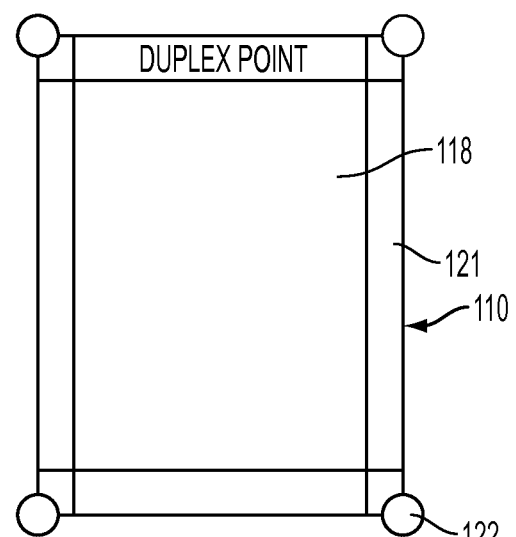
FIG. 7 is a top-view schematic diagram of a device according to embodiments herein.

FIG. 5-7 are schematic top-view diagrams of the multi-touch screen 100 and illustrate the scanning process. As discussed above, to scan a document, the document is placed on the scanning device surface 102, and the lid 105 of the scanning device is then closed. Software based control points are assigned to a rectangular virtual document as shown in FIG. 5. The center of mass of the graphical representation of the document 110 comprises the inner portion (such as the inner 60%, inner 80%, inner 90%, etc., of the height and width) of the graphical representation 110 and is shown in FIG. 5 as item 118. The center of mass 118 can be touched, held, dragged, etc. Touching means to place a finger/pointing device 112 on a point but not to hold it in place. Holding means to keep one's finger/pointing device 112 on a point. Dragging means to keep one's finger/pointing device 112 on the screen while at the same time moving across the screen.

Any dragging by the user to the center of mass 118 will cause the graphical representation 110 to move in a given direction, but will not cause the graphical representation 110 to expand, shrink, rotate, etc. To the contrary, touches made to the outer portion 120 (such as the outer 5%, outer 10%, outer 20%, etc. of the height and width) will generally not move the graphical representation 110, but instead will expand, shrink, rotate, etc., the graphical representation 110. Scanned items that do not have a rectangular shape can be placed on top of a virtual rectangle that best matches their dimensions. FIG. 6 illustrates corner points as shown in items 122, 124 that can be touched, held, dragged, etc. FIG. 7 shows a diagram of duplex points 121, with the center of mass 118 that can also be touched, held, dragged, etc.

Figure 8A:
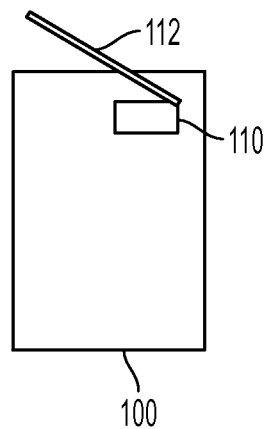
FIG. 8A-8D are top-view schematic diagrams of a device according to embodiments herein.
Figure 8B:
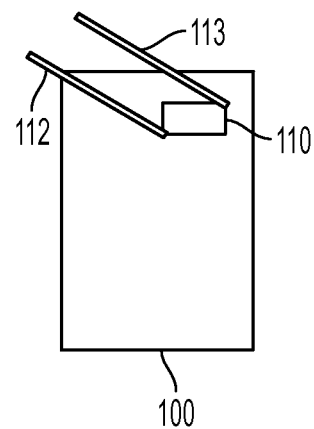
Figure 8C:
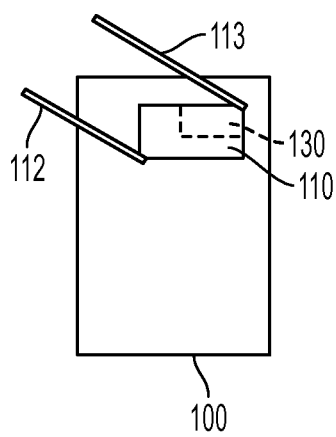
Figure 8D:
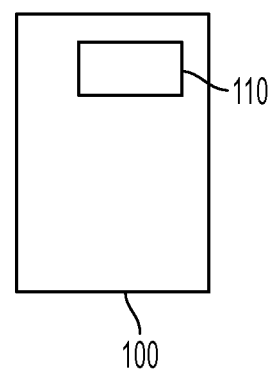

As shown in FIGS. 8A-8D, the embodiments can resize a document. FIGS. 8A-8D are schematic top-view diagrams of the multi-touch screen 100. To resize a document that has previously been scanned, the user can drag a corner point 122, 124 of the document 110 in FIG. 8A by dragging its virtual representation on the screen 100. In FIG. 8B, while continuing to touch that corner 112, the user can touch another corner 113. The user can then move the points they are dragging to adjust the size of the virtual document 130 in the horizontal and vertical dimensions in FIG. 8C. Alternately, the user could touch both the corner points 112, 113 at the same time as shown in FIG. 8C. In FIG. 8D, the user can release one or more of the points that will set the document's size to the last size shown.

Figure 9A:
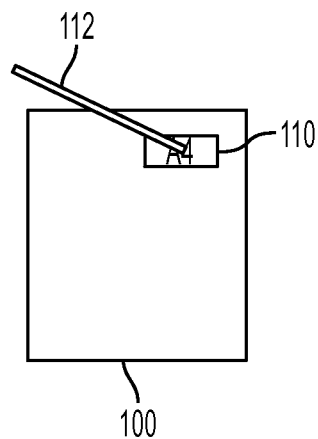
FIG. 9A-9B are top-view schematic diagrams of a device according to embodiments herein.
Figure 9B:
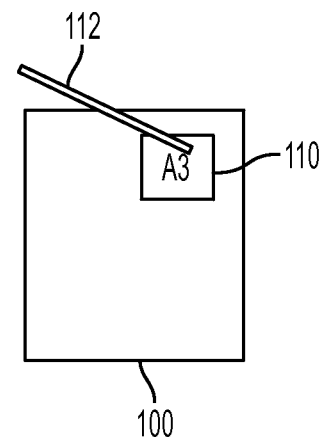

FIGS. 9A and 9B are schematic top-view diagrams of the multi-touch screen 100 and illustrate zooming. Zooming a document is basically enlarging a document to various sizes. This is different than resizing as it will resize the document to the size of available preset print sizes. To zoom the document, the user can tap (touch) the document's center of mass 118 twice in quick succession 112. The time between the first touch and the second touch is adjustable by the system's settings.

Figure 10A:
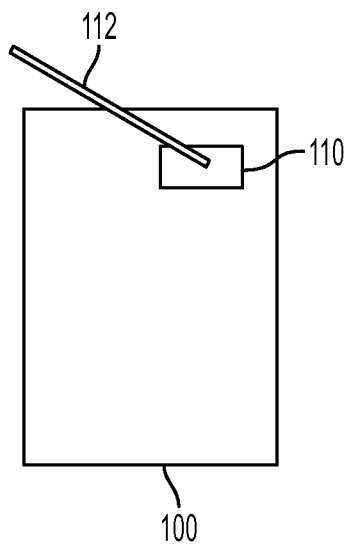
FIG. 10A-10C are top-view schematic diagrams of a device according to embodiments herein.
Figure 10B:
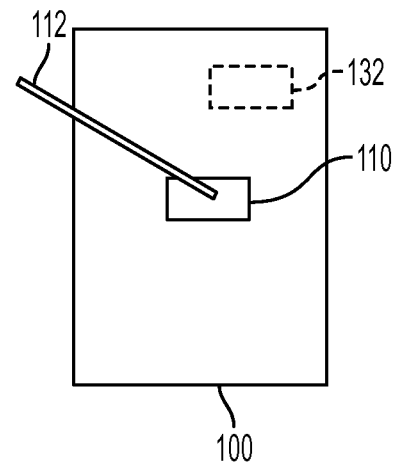
Figure 10C:
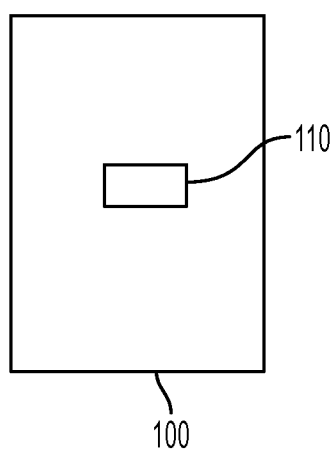

FIGS. 10A-10C are schematic top-view diagrams of the multi-touch screen 100 and illustrate moving a document that can be a used to rearrange the print order of multiple documents or to simply move the document to a location on the screen where the user finds it easier to work with. To move the image of the document 110, the user can touch the document's center of mass 118 and drag their finger 112 to where they would like the document moved. Specifically, in FIG. 10A, the user 112 touches and holds the center of mass 118 of the virtual document on the screen 110. In FIG. 10B, while holding, the user moves their finger 112 to a new location 132 on the screen. In FIG. 10C, the user releases their finger 112 from the screen 100 to set the position.

Figure 11A:
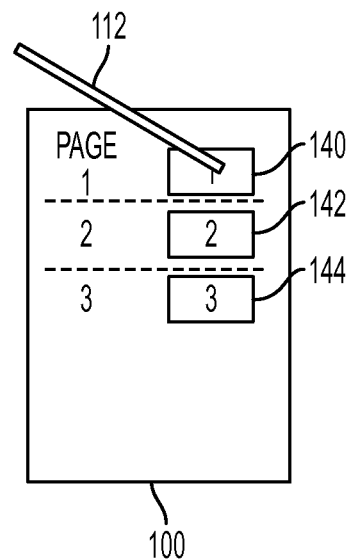
FIG. 11A-11C are top-view schematic diagrams of a device according to embodiments herein.
Figure 11B:
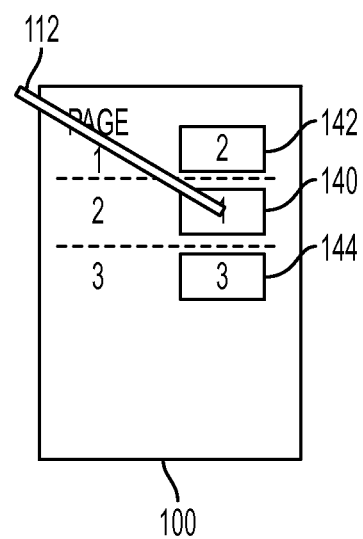
Figure 11C:
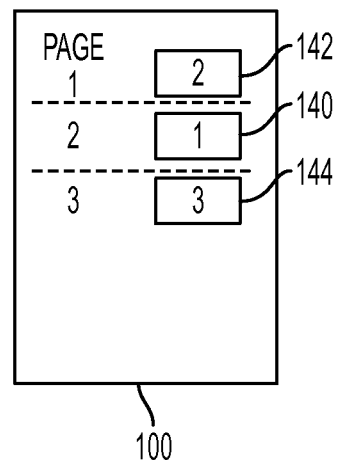

FIGS. 11A-11C are schematic top-view diagrams of the multi-touch screen 100 and illustrate how to change the print order. In FIG. 11A, the user touches item 140 and holds the center of mass of the virtual document on the screen 100. In FIG. 11B, the user while holding, drags their finger 112 to a new location on the screen between the other documents 142 and 144. In FIG. 11C, the user releases their finger 112 from the screen 100 to set the position.

Figure 12A:
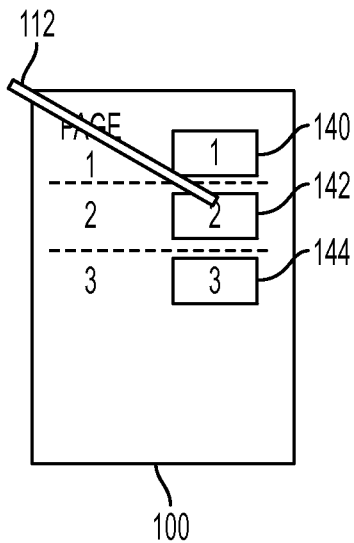
FIG. 12A-12C are top-view schematic diagrams of a device according to embodiments herein.
Figure 12B:
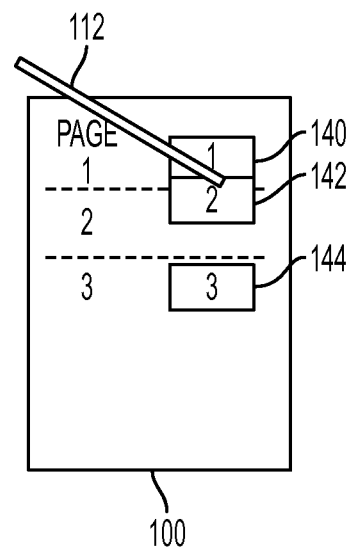
Figure 12C:
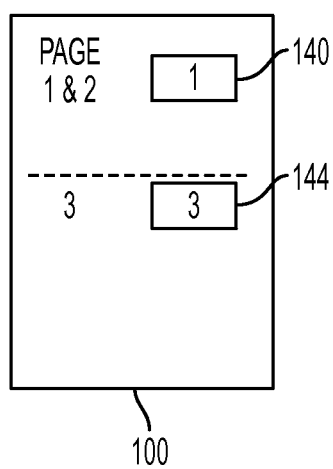

As shown in FIGS. 12A-12C, are schematic top-view diagrams of the multi-touch screen 100 and illustrate how to create a duplex document using several scanned pages, the user can touch and hold their finger 112 on the duplex area 121 of a document 142. In FIG. 12B, while holding, the user can then drag their finger 112 to the duplex area 121 of another page 140. In FIG. 12C, the user can release their finger 112, and the page 142 that was selected will be placed on the back of the other virtual page 140.

Figure 13A:
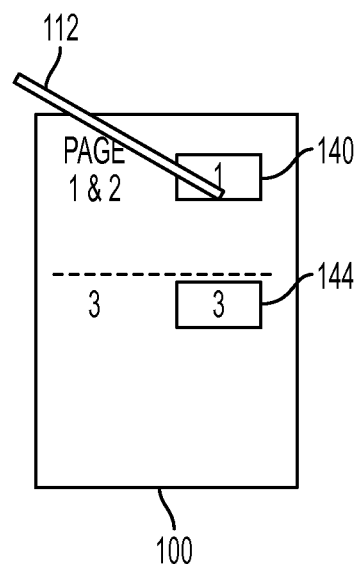
FIG. 13A-13C are top-view schematic diagrams of a device according to embodiments herein.
Figure 13B:
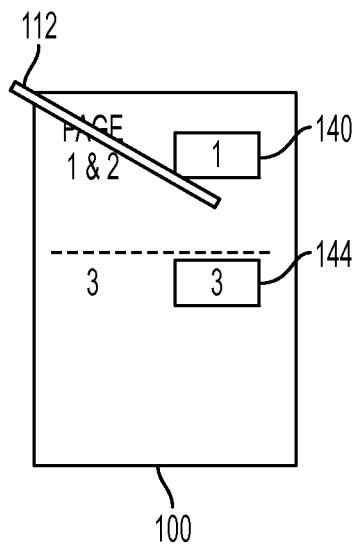
Figure 13C:
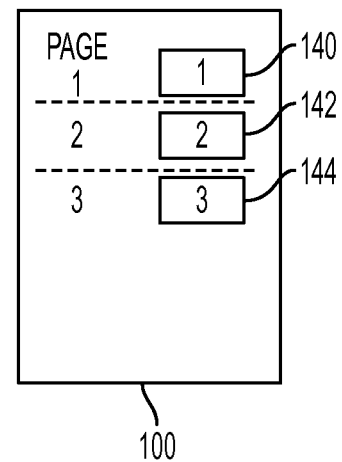
Figure 14A:
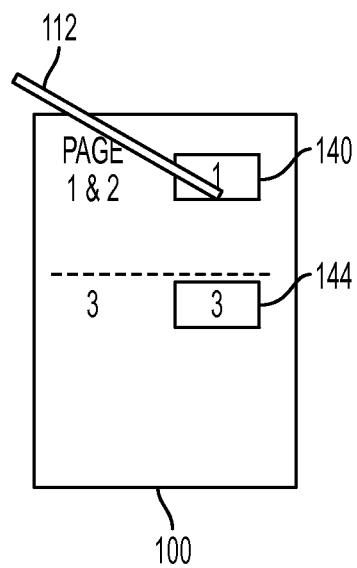
FIG. 14A-14B are top-view schematic diagrams of a device according to embodiments herein.
Figure 14B:
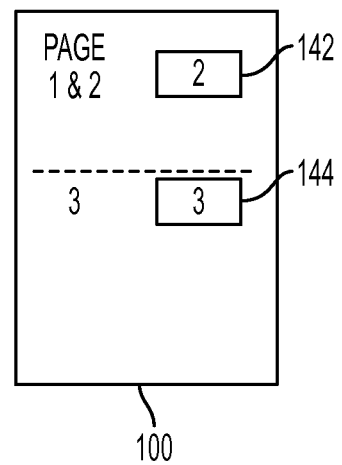

FIGS. 13A-13C are schematic top-view diagrams of the multi-touch screen 100. As shown in FIGS. 13A-13C, to turn a duplex document into a simplex document the user can touch and hold their finger 112 on the duplex area 121 of a duplex document 140. The user then drags their finger 112 from the duplex area 121 to an open area on the screen 100. When the user releases their finger 112, the second page 142 that was on the back of the selected page 140 will be placed on the screen as its own page. As shown in FIGS. 14A and 14B, to flip a virtual document, the user can touch one of the duplex points 121. The point that is touched will cause the virtual document to show the other side of the document 140/142.

Figure 15:
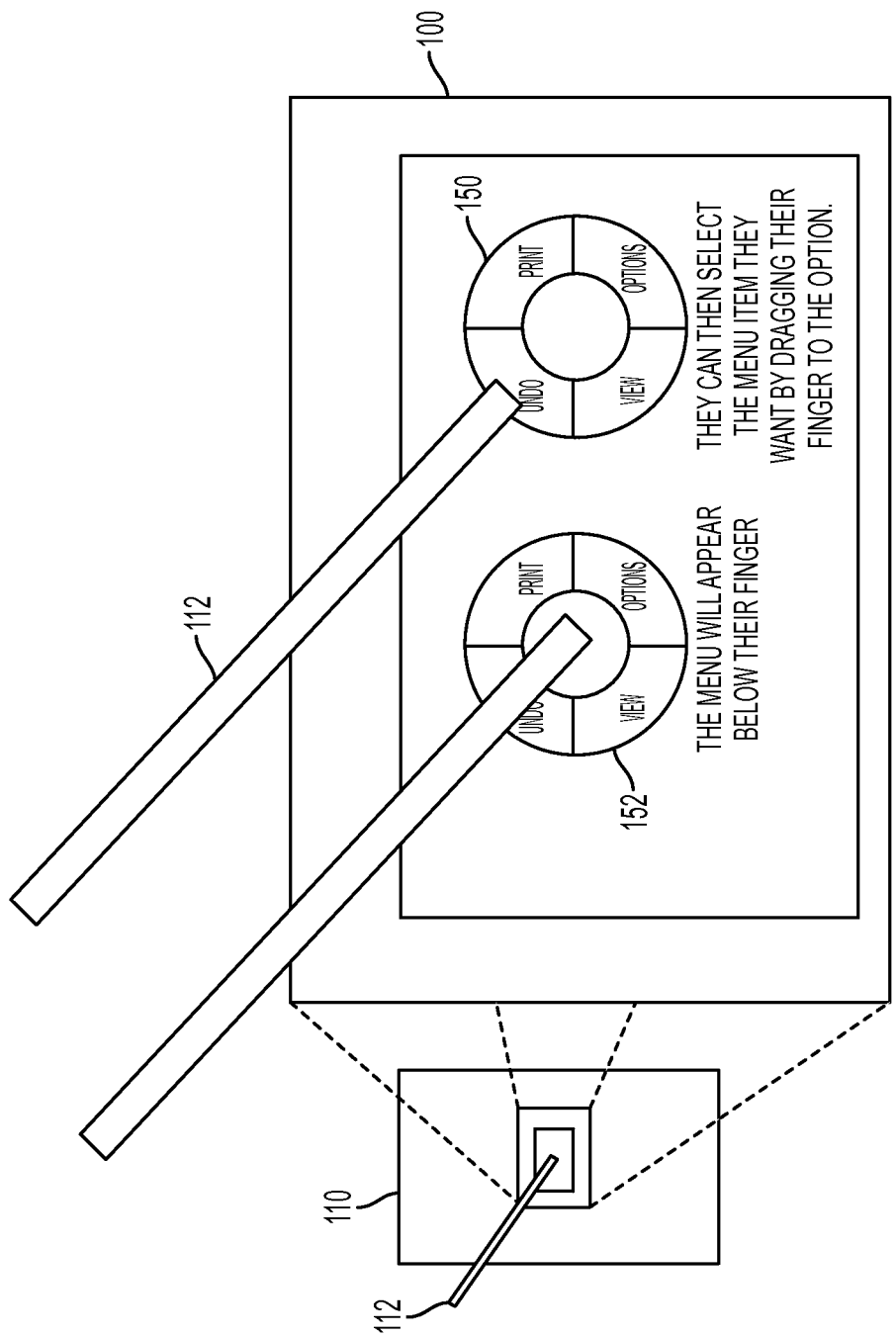
FIG. 15 is a top-view schematic diagram of a device according to embodiments herein.
Figure 16A:
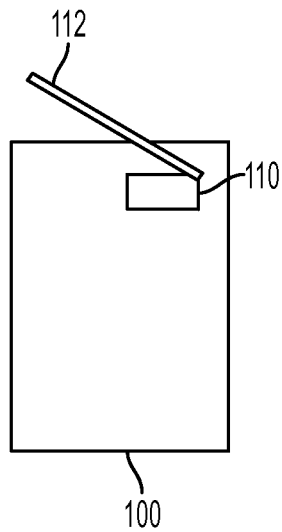
FIG. 16A-16D are top-view schematic diagrams of a device according to embodiments herein.
Figure 16B:
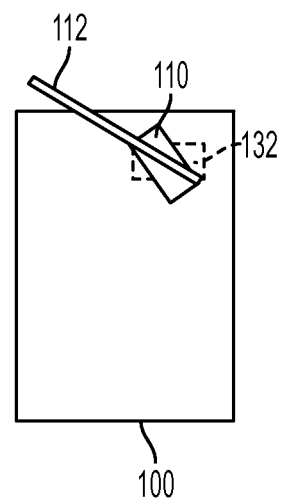
Figure 16C:
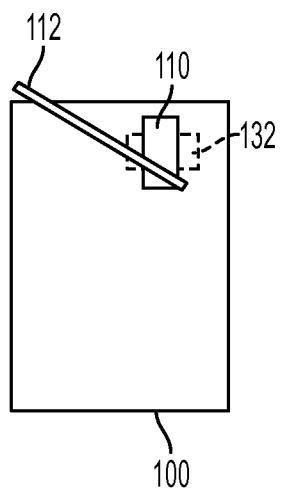
Figure 16D:
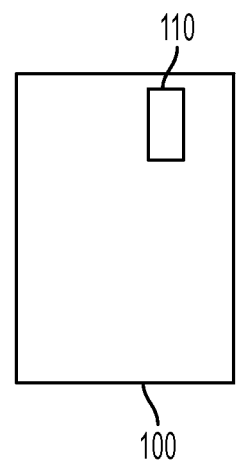

FIG. 15 is schematic top-view diagrams of the multi-touch screen 100. As shown in FIG. 15, to bring up menus 150, 152 with advanced options, the user can touch and hold their finger 112 to a document's center of mass 118, i.e., not a corner, for a minimum specified amount of time, double click the center of mass 118, etc. The menu 150 will appear below their finger 112, and the user can then select the menu item they want by touching or dragging their finger 112 to the option.

FIGS. 16A-16D are schematic top-view diagrams of the multi-touch screen 100. As shown in FIGS. 16A-16D, to resize a document that has previously been scanned, the user 112 can select a corner of the document 110 by touching its virtual representation on the screen 100. The user can then move their finger 112 in a circular manner while holding the corner 110 to rotate the document 132. The user can release the point which will set the documents rotation to the last rotation shown.

Figure 17A:
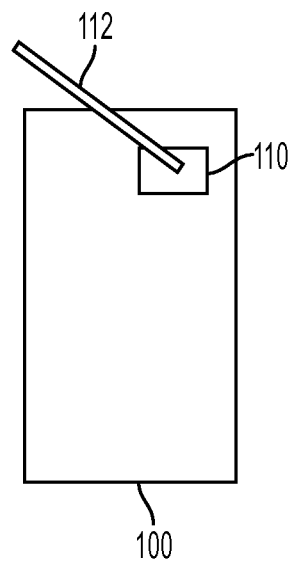
FIG. 17A-17C are top-view schematic diagrams of a device according to embodiments herein.
Figure 17B:
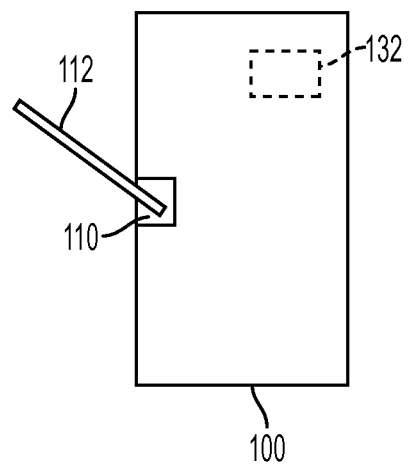
Figure 17C:
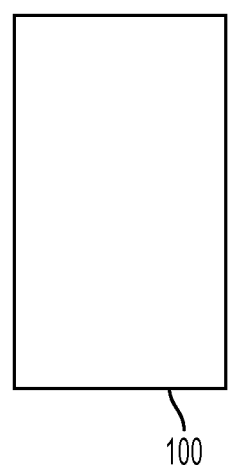

FIGS. 17A-17C are schematic top-view diagrams of the multi-touch screen 100. As shown in FIGS. 17A and 17B, to delete a page that was scanned, the user can move the image off of the screen. Specifically, in FIG. 17A, the user touches the screen 100 with their finger 112 and holds the center of the mass 118 of the virtual document on the screen 110. In FIG. 17B, the user while holding their finger 112, can move the finger off the screen. In FIG. 17C, when a certain portion (e.g., 25%, 50%, 75%, etc.) of the document has moved off the screen, it will be deleted.

Figure 18:
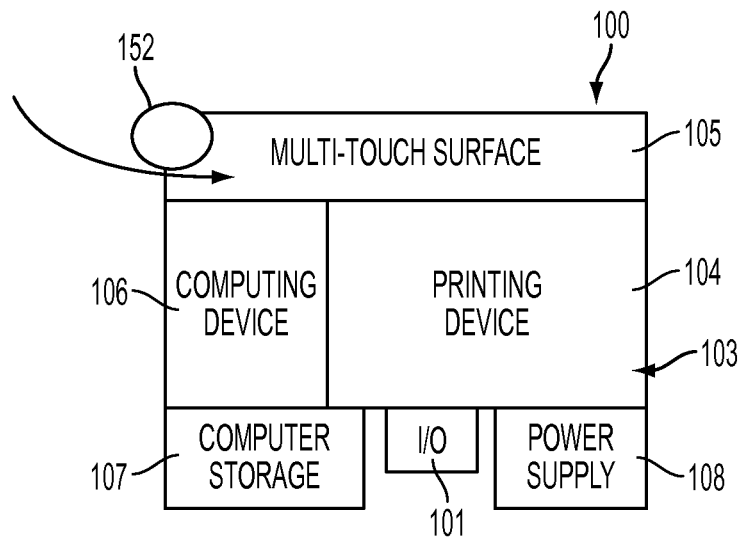
FIG. 18 is a side-view schematic diagram of a device according to embodiments herein.

While the foregoing embodiments illustrate a scanning device that maintains the scanned object in a fixed position and moves a scanning element by the fixed position object during the scanning process, the embodiments herein are equally applicable to scanners that move the scanned objects by a fixed position scanning element during scanning process (paper feed scanners). For example, as shown in cross-sectional view in FIG. 18, the touch screen 100 can be aligned with a fixed-position scanner 152 by being directly below the location where the fixed-position scanner 152 is located.

In such embodiments, documents (represented by an arched arrow in FIGS. 18 and 19) are scanned as they are move past the fixed-position scanner 152. Images of the scanned items can appear on the multi-touch screen 100 as though they are positioned just below the fixed-positioned scanner 152 irrespective of where the fixed-position scanner 152 actually discards the document after paper feed scanning.

Figure 19:
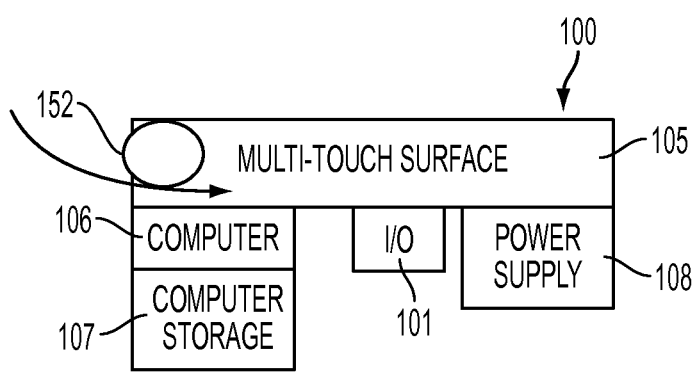
FIG. 19 is a side-view schematic diagram of a device according to embodiments herein.
Figure 20:
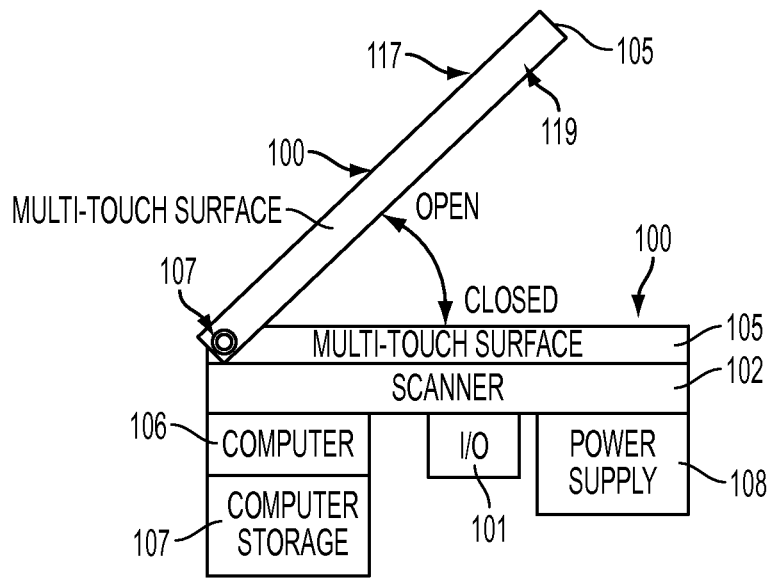
FIG. 20 is a side-view schematic diagram of a device according to embodiments herein.

Further, while the previous embodiments include a printing device 104, alternative embodiments shown in FIGS. 19 and 20 are standalone scanners that do not include such printing devices. More specifically, the embodiment shown in FIG. 19 utilizes a fixed-positioned scanner 152, while the embodiment shown in FIG. 20 utilizes a flatbed scanner 102 with a hinged lid 105 supporting the multi-touch screen 100 (as discussed above).

Figure 21:
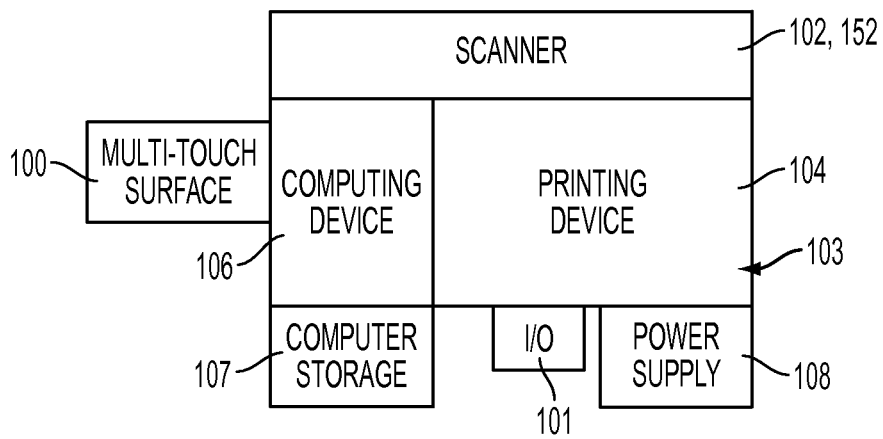
FIG. 21 is a side-view schematic diagram of a device according to embodiments herein.

Alternatively, the multi-touch screen 100 can be located at a different location from the scanner 102, 152 where, for example, the scanner 102, 152 is part of an automated document handler and the multi-touch screen 100 is located adjacent operational keys on the front of the apparatus, and FIG. 21 illustrates such an apparatus.

With embodiments herein the multi-touch screen is placed on the top of the scanning surface so that documents that are scanned by the device can be displayed to the user to appear the same as the document that was placed on the scanning device's scanning surface. The embodiments also use human interactions such as touching, holding, and dragging. These features improve the intuitive nature of the interface provided by the embodiments herein.

Further, with embodiments herein the size of the screen matches (or approximately matches) the size of the scanning surface. This allows for the screen to show, in real size (actual size or approximate actual size) the document (or other item) as it was placed on the scanning surface. Thus, the embodiments herein also allow for the document to appear on the multi-touch screen 100 in the actual size as it will be printed out. The use of a multi-touch screen on a scanner 102 allows for advanced manipulation of displayed documents without the need for elaborate menus.

Therefore, the embodiments herein provide a more intuitive user interface. The interface is more intuitive because it can display the document as it appears on the scanning device's surface and changes can be shown that match the actual size, color, order of papers, and rotation of what will be printed out. The interface is also more intuitive because it uses human actions and concepts when handling documents.

Users want to manipulate documents for copying by setting the number of copies, changing the size of the document, changing the print order, setting the duplex, and rotating the document. The embodiments herein take real world actions and manipulate a virtual representation of a scanned document and then print the document including its changes. The embodiments use timings, a multi-touch screen, gestures, and human factors to determine the action that the user wishes to have done. By measuring the dimensions of the scanned input and assigning control points to the document, a computer can then respond to human actions with a set of predefined actions when these control points are selected and changed.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
   a processor;
   a scanner operatively connected to said processor;
   a platen positioned adjacent said scanner, said platen having a top where scanned items are placed;
   a lid frame covering said platen; and
   a touch screen graphic user interface operatively connected to said processor,
   said scanner being positioned to scan a predetermined scan area of said platen,
   said touch screen having a screen area having dimensions corresponding to said scan area,
   said touch screen being positioned above and aligned with said scan area relative to said top of said platen,
   said touch screen being positioned on said lid frame, and said scan area being aligned with said lid frame.

2. The apparatus according to claim 1, said lid frame having a touch screen side and a scanner side.

3. The apparatus according to claim 2, said touch screen being positioned on said touch screen side of said lid frame and said scanner being positioned on said scanner side of said lid frame.

4. The apparatus according to claim 1, further comprising a printer operatively connected to said processor.

5. An apparatus comprising:
   a base frame;
   a lid frame connected to said base frame;
   a hinge connecting said base frame to said lid frame;
   a processor positioned within said base frame;
   a scanner operatively connected to said processor;
   a platen positioned adjacent said scanner, said platen having a top where scanned items are placed, and said lid frame covering said platen; and
   a touch screen graphic user interface positioned on said lid frame and being operatively connected to said processor,
   said scanner being positioned to scan a predetermined scan area of said platen,
   said touch screen having a screen area having dimensions corresponding to said scan area, and
   said touch screen being positioned above and aligned with said scan area relative to said top of said platen.

6. The apparatus according to claim 5, said lid frame having a touch screen side and a scanner side.

7. The apparatus according to claim 6, said touch screen being connected to said lid frame on said touch screen side of said lid frame.

8. The apparatus according to claim 6, scanner being one of:
   connected to said lid frame on said scanner side of said lid frame; and
   positioned within said base frame and aligned with said scanner side of said lid frame.

9. The apparatus according to claim 5, further comprising a printer operatively connected to said processor.

10. An apparatus comprising:
    a base frame;
    a lid frame hingeably connected to said base frame to be in one of an open state and a closed state;
    a hinge connecting said base frame to said lid frame;
    a platen positioned on said base frame adjacent said lid frame, said lid frame covering said platen when said lid frame is in said closed state on said base frame, and said platen having a top where scanned items are placed;
    a processor positioned within said base frame;
    a scanner operatively connected to said processor and positioned adjacent said platen; and
    a touch screen graphic user interface positioned on said lid frame and being operatively connected to said processor,
    said scanner being positioned to scan a scan area of said platen,
    said touch screen having a screen area having dimensions corresponding to said scan area, and
    said touch screen being positioned above and aligned with said scan area of said platen, relative to said top of said platen when said lid frame is in said closed state.

11. The apparatus according to claim 10, said lid frame having a touch screen side and a scanner side.

12. The apparatus according to claim 11, said touch screen being connected to said lid frame on said touch screen side of said lid frame.

13. The apparatus according to claim 11, scanner being one of:
    connected to said lid frame on said scanner side of said lid frame; and
    positioned within said base frame and aligned with said scanner side of said lid frame.

14. The apparatus according to claim 10, further comprising a printer operatively connected to said processor.

15. An apparatus comprising:
    a processor;
    a scanner operatively connected to said processor;
    a platen positioned adjacent said scanner, said platen having a top where scanned items are placed;
    a lid frame covering said platen; and
    a touch screen graphic user interface operatively connected to said processor,
    said scanner being positioned to scan a predetermined scan area of said platen,
    said touch screen having a screen area having dimensions corresponding to said scan area,
    said touch screen being positioned above and aligned with said scan area relative to said top of said platen,
    said touch screen displaying scanned items in actual size,
    said touch screen being positioned on said lid frame, and said scan area being aligned within said lid frame.

16. The apparatus according to claim 15, said lid frame having a touch screen side and a scanner side.

17. The apparatus according to claim 16, said touch screen being positioned on said touch screen side of said lid frame and said scanner being positioned on said scanner side of said lid frame.

18. The apparatus according to claim 15, further comprising a printer operatively connected to said processor.

19. An apparatus comprising:
a processor;
a computer storage medium operatively connected to said processor and storing computerized instructions executable by said processor;
a scanner operatively connected to said processor;
a platen positioned adjacent said scanner, said platen having a top where scanned items are placed;
a lid frame covering said platen; and
a touch screen graphic user interface operatively connected to said processor,
said scanner being positioned to scan a predetermined scan area of said platen,
said touch screen having a screen area having dimensions corresponding to said scan area,
said touch screen being positioned above and aligned with said scan area relative to said top of said platen,
said touch screen displaying scanned items in actual size,
said touch screen being positioned on said lid frame,
said scan area being aligned within said lid frame, and
said processor executing said computerized instructions to allow users to alter said scanned items appearing on said touch screen by touching different locations of said touch screen.

* * * * *